(12) United States Patent
Cantu' et al.

(10) Patent No.: US 6,923,231 B2
(45) Date of Patent: Aug. 2, 2005

(54) TIRE INCLUDING BLOCKS AND TRANSVERSE NOTCHES

(75) Inventors: Marco Cantu', Carnate (IT); Renato Caretta, Gallarate (IT); Silvio Martiradonna, Parabiago (IT)

(73) Assignee: Pirelli Pneumatici S.p.A., Milan (IT)

( * ) Notice: Subject to any disclaimer, the term of this patent is extended or adjusted under 35 U.S.C. 154(b) by 182 days.

(21) Appl. No.: 09/890,409

(22) PCT Filed: Nov. 29, 2000

(86) PCT No.: PCT/EP00/11898

§ 371 (c)(1),
(2), (4) Date: Oct. 22, 2001

(87) PCT Pub. No.: WO01/39995

PCT Pub. Date: Jun. 7, 2001

(65) Prior Publication Data

US 2002/0134477 A1 Sep. 26, 2002

Related U.S. Application Data

(60) Provisional application No. 60/187,384, filed on Mar. 7, 2000.

(30) Foreign Application Priority Data

Dec. 1, 1999 (IT) .......................................... MI99A2515

(51) Int. Cl.$^7$ ........................ B60C 11/11; B60C 107/00
(52) U.S. Cl. ............................ 152/209.18; 152/209.28; 152/902
(58) Field of Search ........................... 152/209.8, 209.9, 152/209.18, 209.26, 209.28, 902, DIG. 3; D12/584, 595, 601

(56) References Cited

U.S. PATENT DOCUMENTS 3,998,256 A * 12/1976 Verdier
4,649,975 A * 3/1987 Kogure et al.

5,031,680 A * 7/1991 Kajikawa et al.

(Continued)

FOREIGN PATENT DOCUMENTS

| EP | 485884 | * | 5/1992 |
| EP | 547019 | * | 6/1993 |
| EP | 627332 | * | 12/1994 |
| JP | 1-101204 | * | 4/1989 |
| JP | 5-229309 | * | 9/1993 |
| WO | WO 99/17944 | * | 4/1999 |

OTHER PUBLICATIONS

Patent Abstracts of Japan, Publication No. 07164829, Jun. 27, 1995, Yokohama Rubber Co Ltd:The;, Suzuki Toshihiko et al., "Pneumatic Radial Tire for Passenger Car".
Patent Abstracts of Japan, Publication No. 04271905, Sep. 28, 1992, Bridgestone Corp., Himuro Yasuo et al., "Pneumatic Tire".
Patent Abstracts of Japan, Publication No. 63134315, Jun. 6, 1998, Yokohama Rubber Co Ltd; The, Tsuyuki Kunio et al., "Pneumatic Tire".

*Primary Examiner*—Steven D. Maki
(74) *Attorney, Agent, or Firm*—Finnegan, Henderson, Farabow, Garrett & Dunner, L.L.P.

(57) ABSTRACT

A tire for vehicle wheels provided with a tread pattern includes at least one continuous central circumferential groove straddling an equatorial plane of the tire, at least two continuous lateral circumferential grooves having median planes substantially parallel to the equatorial plane of the tire, and a plurality of transverse grooves. These grooves delimit at least four circumferential rows of blocks, two central rows and two shoulder rows. Each block of the central rows is defined by a plurality of sides and at least four vertices, a pair of front vertices and a pair of rear vertices, in relation to a predetermined running direction of the tire. The blocks of the central rows include a first transverse notch having a first terminal end inside a respective block of the central rows and a first starting end communicating with the at least one central circumferential groove.

12 Claims, 5 Drawing Sheets

U.S. PATENT DOCUMENTS

| | | | |
|---|---|---|---|
| 5,088,536 A | * | 2/1992 | Graas et al. |
| 5,109,903 A | | 5/1992 | Watanabe et al. ........... 152/209 |
| 5,240,053 A | | 8/1993 | Baumhöfer et al. ........ 152/209 |
| 5,308,416 A | * | 5/1994 | Baumhofer et al. |
| 5,526,860 A | * | 6/1996 | Minami |
| 5,580,404 A | * | 12/1996 | Hitzy |
| 5,833,781 A | * | 11/1998 | Fukumoto et al. ..... 152/209.19 |

* cited by examiner

TIRE INCLUDING BLOCKS AND TRANSVERSE NOTCHES

CROSS-REFERENCE TO RELATED APPLICATIONS

This application is a national stage entry under 35 U.S.C. § 371 from International Application No. PCT/EP00/11898, filed Nov. 29, 2000, in the European Patent Office; additionally, Applicants claim the right of priority under 35 U.S.C. §119(a)–(d) based on patent application No. MI99A002515, filed Dec. 1, 1999, in the Italian Patent Office; further, Applicants claim the benefit under 35 U.S.C. §119(e) based on prior-filed, copending provisional application No. 60/187,384, filed Mar. 7, 2000, in the U.S. Patent and Trademark Office; the contents of all of which are relied upon and incorporated herein by reference.

BACKGROUND OF THE INVENTION

1. Field of the Invention

The present invention relates to a tyre for vehicles wheels and, more particularly, to a plurality of improvements referring to tyres suitable for using on wet roads without any prejudice to the performances generally required of a tyre running on dry roads.

2. Description of the Related Art

A tyre in its more general form comprises: a carcass structure including a central crown portion and two axially opposite side walls terminating in a pair of beads for the attachment to the rim of a wheel; a belt structure coaxially associated with the carcass structure and a tread band extended coaxially around the belt structure.

Generally the tread band comprises a raised pattern formed by a plurality of transversal and longitudinal grooves giving rise to a plurality of blocks distributed according to different configurations, for example along a central zone straddling the equatorial plane and in at least two shoulder zones extending in positions axially opposite the central zone.

Tyres comprising a tread band of the "block" type satisfy the requirement of gripping when compared with tyres the pattern of which comprises continuous circumferential ribs that confer good directional capacity to the tyre, but which prove not to possess sufficient gripping above all when adverse weather conditions, such as for example a road surface that is wet, covered with snow or ice, or even a slightly sloping road, have to be faced.

As the tyre rolls, the blocks of the tread band are subjected to a set of thermo-mechanical stresses, which are all the greater the more severe the conditions of use and which result in changes to their geometry and, over varying time periods, to a deterioration in the tyre's performance.

In particular, the contact with the ground during running produces a flexing of the trailing edge of the blocks of the tyre, said edge, by dipping down radially inwardly and moving in the direction opposite the direction of running, produces a restriction of the groove that separates it from the next block. This phenomenon leaves the leading edge of the latter open to a tangential stress which is repeated cyclically at each revolution of the wheel causing a typical uneven and premature wear known as "saw-tooth" wear phenomenon. The recourse to possible solutions comprising blocks of considerable extent, therefore with high resistance to stresses and resultantly less wear, contrasts with the requirement of good adhesion of the tyre to the road. In fact, very extended blocks under running conditions on wet roads leave a continuous film of water in the footprint area between block and ground that is difficult to break with consequent risks of driving instability.

In order to limit the wear due to mobility of the blocks under the footprint area, in some areas of the tread band two rows of blocks separated by a narrow groove was used so that said groove, by closing under the footprint area, produced a reciprocal support between said two rows with a consequent strengthening and reduction in the mobility of the blocks.

A tyre of the "block" type with performances suitable for use on wet roads is described, for example, in patent U.S. Pat. No. 5,240,053.

The tread band of said tyre comprises five circumferential grooves and a plurality of transversal grooves forming complessively six rows of blocks, two central rows, two intermediate rows axially opposite the central ones and two axially external shoulder rows.

The two central rows of blocks are kept apart by a narrow circumferential groove passing through the equatorial plane of the tyre. The width of said central circumferential groove is between ¼ and ⅓ of the width of the other circumferential grooves, while its depth is substantially the same as that of the other circumferential grooves.

The transversal grooves of all the blocks rows arranged to the side of the equatorial plane are inclined to the latter according to angles oriented in the same direction.

Each block of the central rows comprises a notch extending between a lateral circumferential groove and a point at a distance from the narrow central groove. This notch is parallel to the transversal grooves.

Furthermore, in order to reinforce the central blocks in relation to the stresses acting on the central area of the tread band, elastic bridges are provided between circumferentially adjacent blocks.

Each block of the intermediate rows comprises two notches of the same length, both parallel to the transversal grooves.

One of the notches communicates with the axially innermost circumferential groove and the other with the axially outermost circumferential groove and both the notches terminate at a distance from the longitudinal median line of the block, said median line being substantially parallel to the equatorial plane.

As a whole, said pair of notches confers a "S" shape to each block of the intermediate rows.

In consideration of the state of the art, the Applicant posed the problem of improving the known technique and producing a tread band provided with a pattern suitable for both dry ground and wet ground having features suitable to guarantee resistance to the stresses acting on the tyre under conditions of use on straight and cornering runnings, together with good driving stability and suitable noise-free features.

The solution to this problem appeared extremely complex since a tread band is characterized by the so-called "solids/voids" ratio which depends on the amount of rubber taken off the tread band due to the presence of the grooves and, as widely known, to high values of this ratio correspond good gripping features on dry roads but low roadholding values on wet roads.

SUMMARY OF THE INVENTION

The Applicant has perceived that the formation of very large blocks, or at any rate with a large transversal dimension in the direction of the forces acting on the tread itself, would not have had a negative impact on the adhesion features on wet roads if the body of the block had been provided with appropriate solutions in order to dispose of the water under the footprint area.

The Applicant has found that the problem could be resolved by adopting a tread pattern comprising, at the sides of the equatorial plane, two rows of axially internal blocks and two rows of axially external blocks with the improvement of making each block of said axially internal rows with a considerable axial width, with respect to the width of the tread band, and with a notch extending over a large part of the transversal dimension of said block and communicating with a lateral circumferential groove suitable for conveying and discharging the water out of the footprint area while said tyre is running on a wet road.

Furthermore, the Applicant has perceived that it is possible to guarantee good driving stability by breaking the continuity of direction of the shoulder transversal grooves with respect to the direction of the grooves of the inner rows in such a way as to break the formation of an overall groove having a substantially sinusoidal trend which can give rise to thrusting on the tyre (helix effect) according to undesired directions.

Therefore, a first aspect of this invention is a tyre for vehicles wheels provided with a tread pattern comprising:

at least one continuous central circumferential groove straddling the equatorial plane of said tyre, at least two continuous circumferential grooves arranged to the sides of said central groove and having median planes substantially parallel to said equatorial plane, a plurality of transversal grooves delimiting on the whole at least four circumferential rows of blocks, two axially internal central rows and two axially external shoulder rows, each block of said central rows being defined by a plurality of sides and by at least four vertices, a pair of front vertices and a pair of rear vertices in relation to a predetermined running direction of said tyre, characterized in that:

a) the blocks of said central rows comprise a first transversal notch having a terminal end inside the block and a starting end communicating with said central circumferential groove;

b) said first transversal notch extends beyond the longitudinal median plane of said central rows;

c) the ratio between the axial width of each central row and the overall axial width of the tread band, measured between the shoulder ends of said tyre, is not less than 0.18;

d) the transversal grooves of the shoulder rows delimiting the shoulder blocks comprise, at least in the vicinity of the median planes of said lateral circumferential grooves, inclined portions in relation to said equatorial plane in the direction opposite the inclination of the transversal grooves possessed by the blocks of said central rows.

Said first transversal notch may have different shapes, for example curved, rectilinear or mixtilinear.

For the purposes of the present disclosure and the claims that follow, "front side" or "rear side" of a block is intended as any side of said block which is located according to a direction substantially transversal to the given running direction of the tyre.

In a preferred embodiment of the invention, said first transversal notch, possessed by the blocks of the central rows, has a length not less than 50% of the length of the longest front or rear side of said block.

More preferably, said first notch extends in an intermediate position to said block and has a length of between 60% and 80% of the length of the longest front or rear side of the block.

According to further preferred embodiments of the invention, the blocks of said central rows have a rhomboid configuration and, preferably, the front and rear sides of each block are parallel and equal to each other.

In accordance with a further embodiment, a plurality of blocks of said central rows comprises at least a second transversal notch having a terminal end inside the block itself and a starting end preferably communicating with a lateral circumferential groove.

Said second transversal notches may assume different shapes; generally they are elongated and preferably have a rectilinear median axis.

In a particular embodiment, said second transversal notches have a blind configuration. As stated above, however, preferably said second transversal notches have an open configuration and possess a starting end that departs from a lateral circumferential groove. Even more preferably said second transversal notches constitute the prolongations of the transversal grooves of the shoulder rows.

Said first and second transversal notches are substantially perpendicular to each other and do not intersect.

A second aspect of the present invention is a premoulded tread band for the retreading of worn tyres for vehicles wheels, said tread band being provided with a tread pattern comprising:

at least one continuous central circumferential groove straddling the equatorial plane of said tyre, at least two continuous circumferential grooves arranged to the sides of said central groove and having median planes substantially parallel to said equatorial plane, a plurality of transversal grooves delimiting on the whole at least four circumferential rows of blocks, two axially internal central rows and two axially external shoulder rows, each block of said central rows being defined by a plurality of sides and by at least four vertices, a pair of front vertices and a pair of rear vertices in relation to a predetermined running direction of said tyre, characterized in that:

a) the blocks of said central rows comprise a first transversal notch having a terminal end inside the block and a starting end communicating with said central circumferential groove;

b) said first transversal notch extends beyond the longitudinal median plane of said central rows;

c) the ratio between the axial width of each central row and the overall axial width of the tread band, measured between the shoulder ends of said tyre, is not less than 0.18;

d) the transversal grooves of the shoulder rows delimiting the shoulder blocks comprise, at least in the vicinity of the median planes of said lateral circumferential grooves, portions which are inclined in relation to said equatorial plane in the direction opposite the inclination of the transversal grooves belonging to the blocks of said central rows.

According to further embodiment, said ratio is not less than 0.40. More preferably said ratio is between 0.40 and 0.50.

BRIEF DESCRIPTION OF THE FIGURES

Further characteristics and advantages will become apparent from the description that follows of some preferred embodiments of a tyre according to the invention, provided purely by way of an illustrative, non-restrictive example, and with reference to the accompanying drawings, where.

DETAILED DESCRIPTION OF THE PREFERRED EMBODIMENTS

Figure 1:
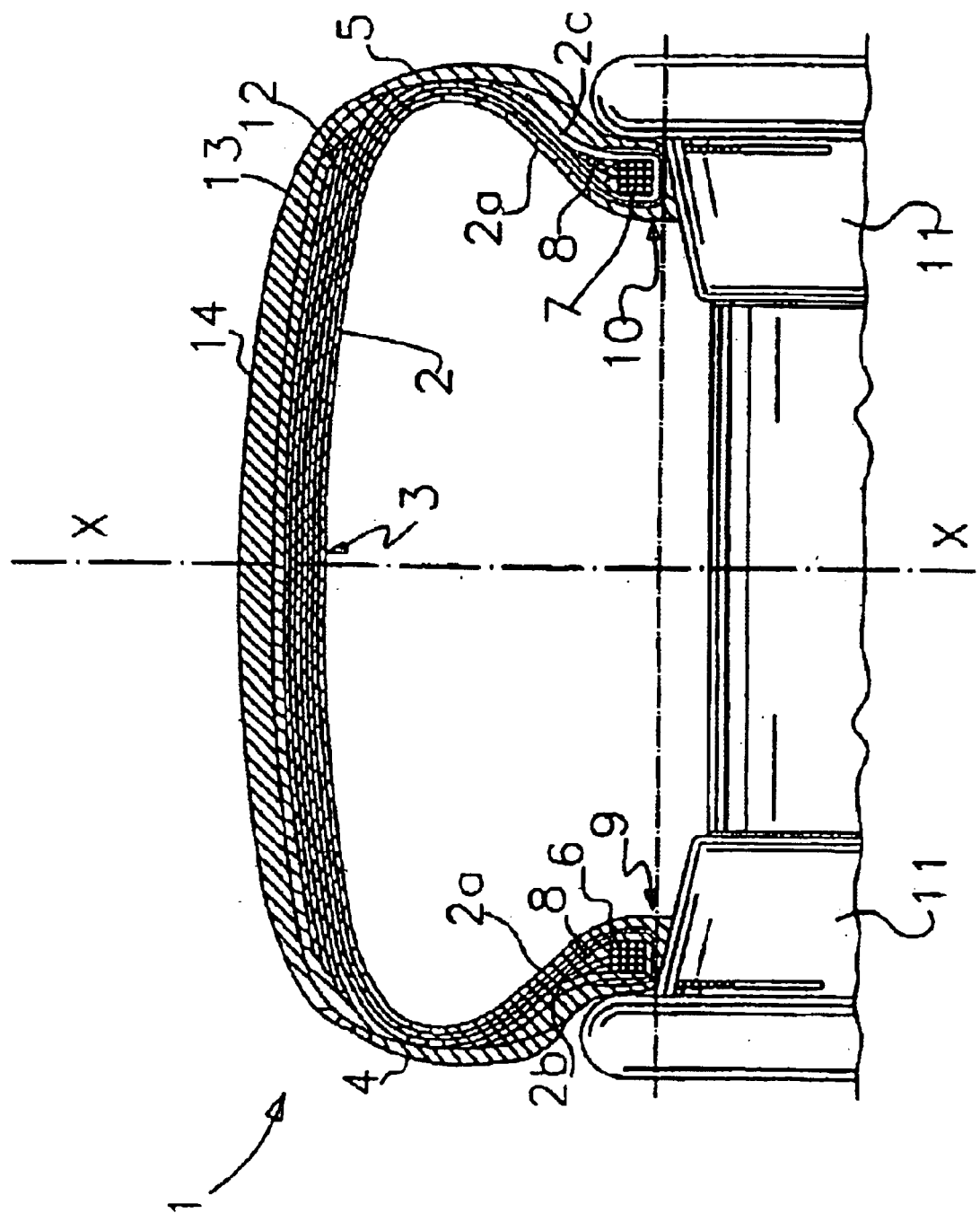
FIG. 1 shows a transverse sectional view of a tyre according to the invention, in particular of a tyre intended to be fitted on the front axle of a vehicle.
Figure 2:
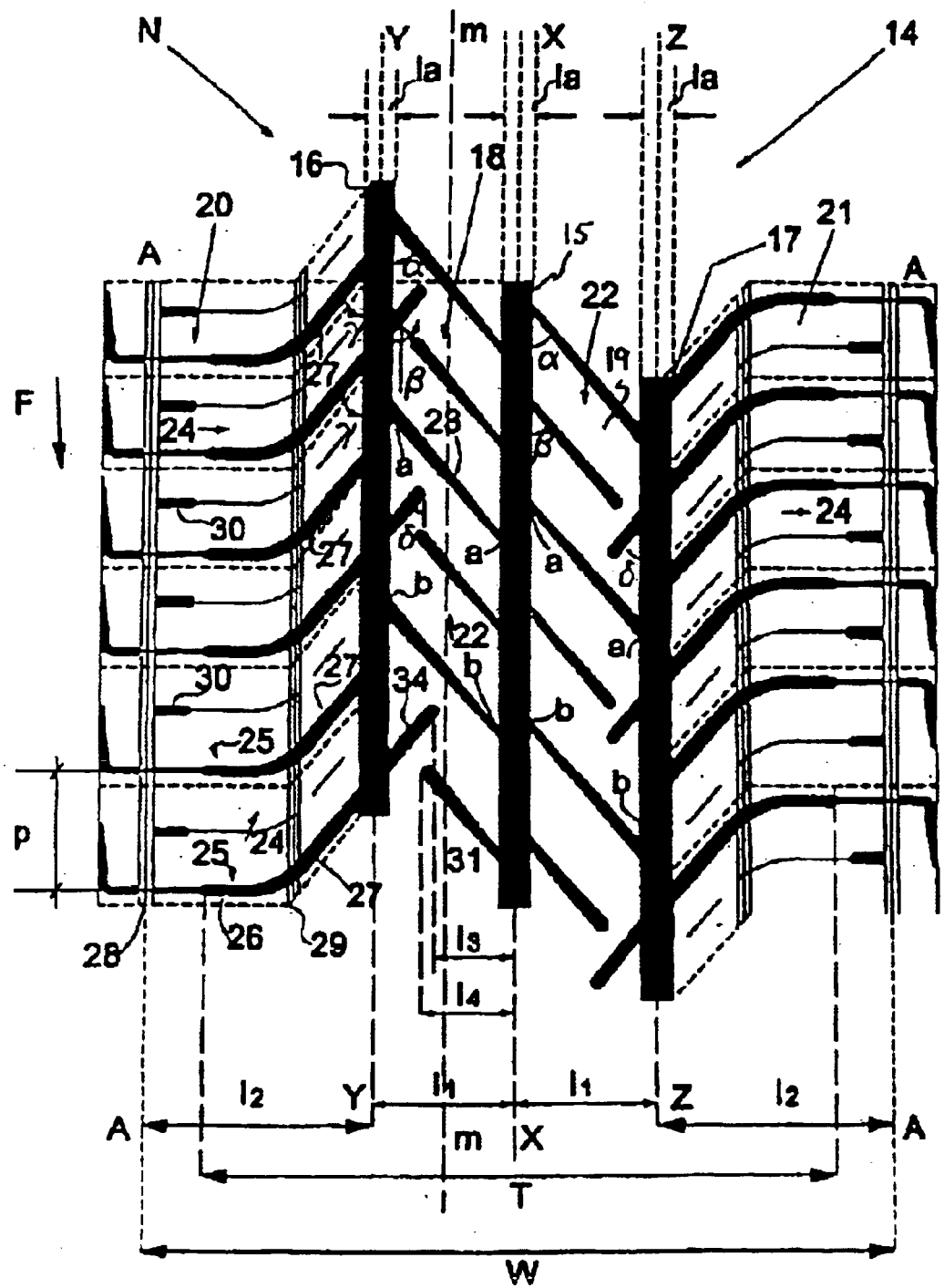
FIG. 2 shows a plan view of a partial development of the tread band of the tyre of FIG. 1.

With reference to FIGS. 1 and 2, a tyre for vehicles according to the invention is generically indicated with reference sign 1, in particular a tyre intended to be fitted on the front axle of a motor vehicle.

Tyre 1 comprises a carcass structure 2, including a central crown portion 3 and two sidewalls 4, 5, said carcass structure 2 being provided with a reinforcing ply 2a the opposite ends of which 2b, 2c are wound around corresponding bead wires 6, 7.

An elastomeric filler 8, occupying the space defined between reinforcing ply 2a and corresponding ends 2b, 2c of reinforcing ply 2a, is applied to the radially external perimeter edge of bead wires 6, 7, arranged in correspondence with the radially internal ends of said sidewalls 4, 5.

As is known, the opposite zones of tyre 1, each comprising bead wires 6, 7 and filler 8, form the so-called beads, globally indicated with reference signs 9 and 10, adapted for anchoring tyre 1 to a corresponding mounting rim 11 of the wheel of a vehicle.

Coaxially associated with the above-mentioned carcass structure 2 is a belt structure 12 comprising one or more reinforcing strips 13 made of fabric or metallic cords drowned in a given compound.

A tread band 14, into the thickness of which a tread pattern illustrated in greater detail in FIG. 2 has been impressed, is applied in a known way on belt structure 12.

Hereinbelow, for simplicity of the description, only that part of tread band 14 of FIG. 2 disposed on the left of the equatorial plane X—X shall be detailed since the part located on the right of said plane is identical to the left part after being turned over by 180° and subsequently staggered by a predetermined amount, in the circumferential direction, equal to approximately 50% of the pitch "p" with which the shoulder transversal notches are repeated in the circumferencial direction.

Tread band 14 comprises three continuous circumferential grooves, substantially rectilinear in type, and a plurality of transversal grooves, the intersection of which with said circumferential grooves gives rise to a plurality of blocks.

Figure 3:
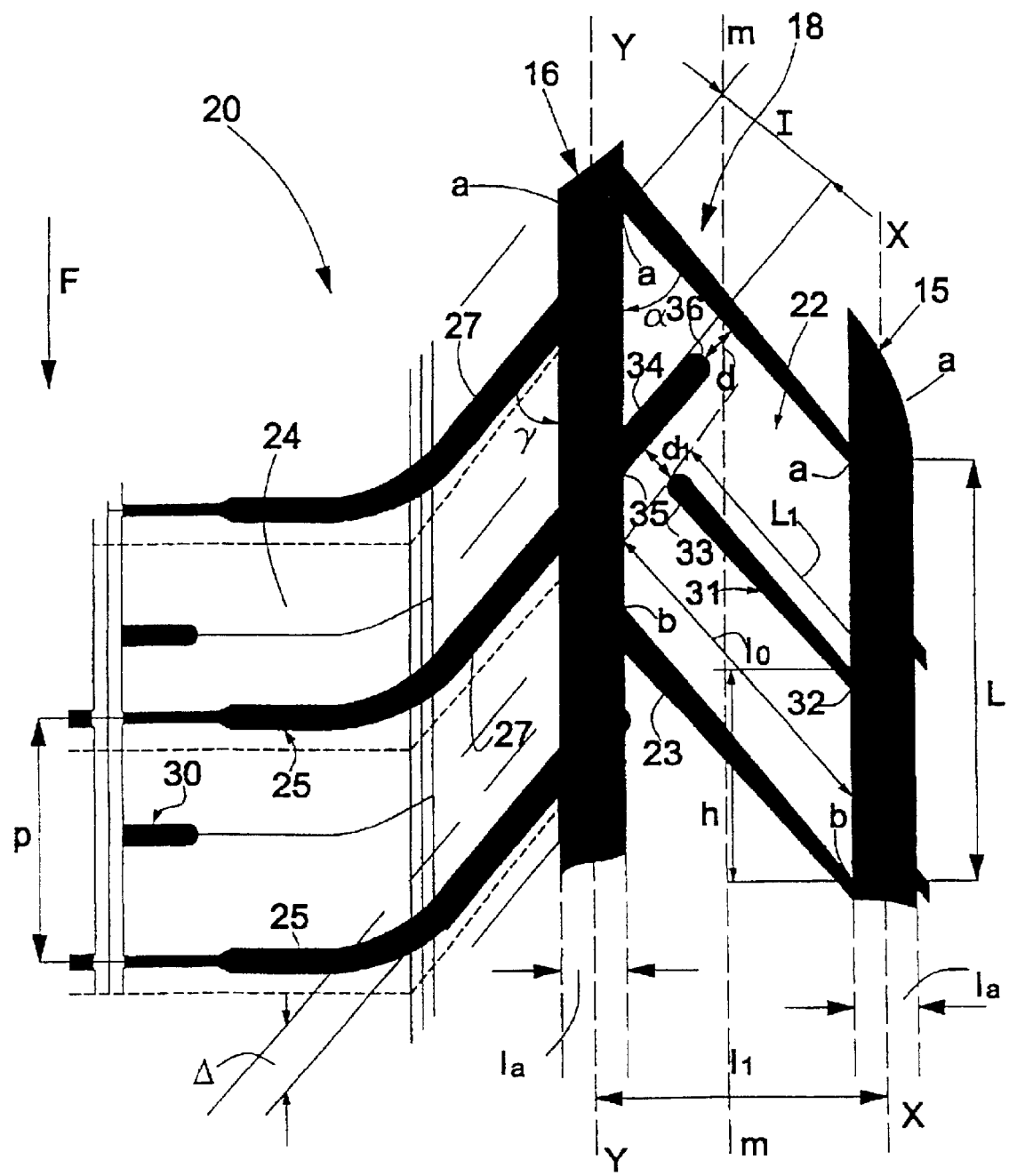
FIG. 3 shows a detail of FIG. 2.

In greater detail, tread band 14 shown in FIGS. 2 and 3 comprises a central circumferential groove 15 straddling the equatorial plane X—X and two lateral circumferential grooves 16, 17 arranged at opposite ends with respect to said central circumferential groove 15 and having respective median planes Y—Y and Z—Z. The latter are both at the same distance $l_1$ from the equatorial plane X—X.

In the embodiment shown in FIGS. 2 and 3 three circumferential grooves 15, 16, 17 are of the same shape and dimensions.

Advantageously said circumferential grooves 15, 16, 17 have an axial width and depth suitable to ensure a sufficient disposal of the water to guarantee driving stability on wet surfaces. Preferably said axial width ($l_a$) is between 7 mm and 12 mm and said depth is between 6 mm and 9 mm.

Circumferential grooves 15, 16, 17 and the transversal grooves, by intersecting each other, delimit on the whole four circumferential rows of blocks which, in the particular embodiment shown in FIGS. 2 and 3, are represented as follows: two rows of axially internal or central blocks 18, 19 and two rows of axially external or shoulder blocks 20, 21.

Even more particularly, in the embodiment of FIG. 2 two central rows 18, 19 are equal and, analogously, the two shoulder rows are equal too.

The illustrated embodiment has special shapes for blocks 22 of central rows 18, 19 and for blocks 24 of shoulder rows 20, 21.

More particularly, with reference to the portion of tread band arranged to the left of the equatorial plane X—X and to the running direction indicated with the arrow F in FIG. 2, blocks 22 of central row 18 have a rhomboid shape defined respectively by a pair of longitudinal parallel sides and defined by central 15 and lateral 16 circumferential grooves and by a pair of identical and parallel front and rear sides comprised respectively between a pair of front vertices a—a and a pair of rear vertices b—b.

Each block 22 of the central rows is separated from an adjacent block 22, which is also consecutive in the circumferential direction, by a groove 23 having an oblique direction with respect to the equatorial plane X—X.

In a particular embodiment, grooves 23 are slightly tapered starting from lateral circumferential groove 16 towards central circumferential groove 15. According to further embodiments, alternatives to the previous one, said grooves 23 are of the same width.

In relation to the direction of the equatorial plane X—X, oblique grooves 23 form an angle α of predetermined value and preferably between 30° and 60°. Even more preferably α is of about 45°.

In view of the slight taper of oblique grooves 23, visible in FIG. 2, the angle α corresponds to the angle formed by the crossing of a longitudinal side of the rhomboid-shape blocks 22 of the central rows and of a front or rear side of said blocks.

Preferably said oblique grooves 23 have a width of between 2 mm and 7 mm and a depth of between 6 mm and 8 mm.

Each block 24 of shoulder row 20 is delimited by two, substantially parallel shoulder transversal grooves 25.

Said blocks 24 of shoulder row 20 are laterally comprised between two planes Y—Y and A—A substantially parallel to the equatorial plane X—X and having reciprocal axial distance $l_2$. The two planes A—A, axially opposite with respect to the equatorial plane X—X, pass through the ends of tread band 14.

Each shoulder transversal groove 25 comprises a first straight portion 26 followed by a second portion 27, axially more internal with respect to said first straight portion 26, said second portion 27 being inclined by an angle γ with respect to the equatorial plane X—X. Said angle γ is different from 90° and is preferably between 30° and 60°.

According to one of the characteristics of the invention the angle γ can assume any value provided that its direction, in relation to the equatorial plane, is opposite the direction of the angle α formed by oblique grooves 23 of blocks 22 of the central rows. In other words, for the purposes of the present invention, it is very important that the inclination of second portion 27 of shoulder transversal grooves 25 defined by said angle γ is in the direction opposite with respect to the inclination of oblique grooves 23 of blocks 22 defined by said angle α.

In the embodiment shown in FIGS. 2 and 3, the angles α and γ are of the same amplitude (to be precise, 50°) and are in the opposite direction to the equatorial plane X—X.

Conveniently the two portions 26, 27 of each shoulder transversal groove 25 are joined together by a curved portion, such as for example an arc of a circle having a radius of between 30 mm and 60 mm.

As can be seen clearly in FIG. 2, first straight portion 26 of each shoulder transversal groove 25 is substantially perpendicular to the equatorial plane X—X and is divided into two parts of different dimensions. More particularly, the first, axially innermost part is approximately 8 mm wide and between 6 mm and 8 mm deep whereas the second, axially outermost part, is of lesser width, approximately 4 mm, and between 2 mm and 6 mm deep.

It was advantageously found that the above-mentioned reduction of the width of straight portion 26 of shoulder transversal grooves 25, by increasing the surface area of the solids in the shoulder zone, contributes to improving the roadholding of the tyre of the invention when cornering.

Furthermore, in each shoulder zone tread band 14 of tyre 1 comprises at least one longitudinal notch, or "disconnect notch" 28, extending circumferentially with a depth of approximately 2 mm, and at least one longitudinal incision 29.

Notch 28 and incision 29 are oriented in a direction substantially perpendicular to shoulder transversal grooves 25.

Longitudinal notch 28 is approximately 4 mm wide and approximately 1.5 mm deep, whereas longitudinal incision 29 is approximately 2.5 mm wide and between 3 mm and 7 mm deep.

Advantageously said incisions and said notches improve the roadholding of the tyre of the invention on wet roads.

Tyre 1 in each shoulder zone conveniently also comprises a plurality of transversal nicks 30 communicating with longitudinal notches 28 and substantially perpendicular to the latter.

Said nicks 30 are arranged at approximately the half-way point of block 24, with respect to the circumferential direction, and extend into the axially external shoulder zone, that is to say into the vicinity of the above-mentioned plane A—A.

Said nicks have a limited length, preferably between 8 mm and 20 mm, a depth of approximately 3 mm and a width of approximately 4 mm.

Advantageously the presence of said nicks 30 in the shoulder zones contributes in increasing the gripping of the tyre of the invention.

Further characteristics of tread band 14 according to the invention will now be described in greater detail with reference to FIG. 3.

Blocks 22 of central row 18 have a rhomboid shape of considerable extension which is delimited in area, as stated above, by a pair of longitudinal sides and a pair of front and rear sides disposed transversally to the running direction F. Said longitudinal sides have a length L, measured in the circumferential direction, considerably greater than the length of the longitudinal sides of shoulder blocks 24. In addition, the length of the front and rear sides of said blocks 22 is comparable with said length L.

In one embodiment relating to tyres with a peripheral development, measured along the equatorial plane, of between 1970 mm and 2010 mm, it was found to be convenient for the longitudinal sides of blocks 22 to have a length L of between 50 mm and 80 mm, and for the front and rear sides of said blocks to have a length Lo of between 40 mm and 60 mm.

In greater detail, in order to confer high resistance to blocks 22, it was found convenient to produce a ratio $l_1/W$ of not less than 0.18, where $l_1$ is the axial width of central row 18 (namely, the axial distance respectively between planes X—X and Y—Y) and W is the axial width of the tread band defined, as stated above, between the pairs of axially opposite planes A—A. Said width W is preferably between 210 mm and 235 mm.

In still greater detail, having defined with T the footprint area (see FIG. 2), since said width T is less than the width W of the tread band, it must be considered that the percentage ratio between the total width of the two central rows 18, 19 (namely, $2l_1$) and the width T of the footprint area is at least 40%.

In substance, the two central rows 18, 19 contribute decisively to confer mechanical resistance to the tread band in the presence of various stresses generated while the tyre is rolling.

Additionally, in accordance with a characteristic of the invention, tread band 14 inside blocks 22 of central rows 18, 19, comprises suitable water draining elements made of a transversal notch 31 of considerable extension.

The middle line of said transversal notch 31 extends between two ends 32, 33, respectively starting and terminal (see FIG. 3), starting end 32 communicating directly with central groove 15 and terminal end 33 being located inside block 22.

Starting end 32 of transversal notch 31 is located at a distance h from the front vertex a of block 22 of between 0.4 L and 0.6 L. Still more preferably, said starting end 32 is about half-way along the length L of block 22.

In the embodiment illustrated in FIG. 3, transversal notch 31 starts from its starting end 32 and crosses much of block 22, going beyond the longitudinal median plane m—m of central row 18.

As shown in FIGS. 2 and 3, in the described embodiment transversal notch 31 stays substantially parallel to the pair of front and rear sides of the rhomboidal configuration of block 22, signifying that said transversal notch 31 is inclined with respect to the equatorial plane X—X.

Having defined the length of transversal notch 31 with $L_1$, said length $L_1$ is not less than 0.5 times the length Lo of the front or rear side of block 22. Still more preferably the value of $L_1$ is between 0.6 Lo and 0.8 Lo.

In a preferred embodiment, transversal notch 31 has a width which tapers gradually starting from terminal end 33 towards starting end 32. In a further and different embodiment, said transversal notch 31 has a constant width.

Conveniently, the width and depth of transversal notch 31 correspond to those of oblique grooves 23 of blocks 22. In other words, transversal notches 31 also have a width of between 2 mm and 7 mm and a depth of between 6 mm and 8 mm.

In accordance with the present invention, each block 22 has a further water-draining element made from a second transversal notch 34 notably less wide than transversal notch 31.

According to a particular embodiment of the invention, it was found to be convenient for the ratio of the length of second transversal notch 34 and the length of transversal notch 31 to be between 0.45 and 0.55.

In the preferred embodiment illustrated in FIGS. 2 and 3, said second transversal notch 34 constitutes the prolongation of one of the two shoulder transversal grooves 25 (delimiting axially shoulder blocks 24), the median axes of which are included in a same pitch "p" of tyre 1 of the invention.

Therefore, as shown in FIG. 3, said second transversal notch 34 starts from a first end 35 (starting end) communicating with lateral groove 16 and extends, maintaining the same direction as adjacent transversal groove 25, into block 22 until it meets a second end 36 (terminal end) located at a distance d from the rear end of block 22.

The two transversal notches 31, 34 of block 22 are substantially perpendicular to each other and notch 31 maintains its terminal end 33 at a predetermined distance $d_1$ from the longitudinal axis of the second transversal notch 34.

Preferably said distances d and $d_1$ have the same value, said value being between 5 mm and 15 mm.

In some embodiments (see, for example, FIG. 2) terminal ends 33 of transversal notches 31 are aligned along a same plane, the distance 14 of which from the equatorial plane X—X is between 20 mm and 40 mm, whereas terminal ends 36 of transversal notches 34 are aligned on a further plane, the distance $l_3$ of which from the equatorial plane X—X is between 15 mm and 35 mm.

According to further solutions, alternative to the ones previously described, the terminal ends of transversal notches 31 or 34 are misaligned with one another. According to a further alternative solution, all the terminal ends of transversal notches 31 and 34 are aligned with one another along the same plane.

As stated above, each block 22 has within itself draining elements made from a pair of transversal notches 31, 34.

Figure 4:
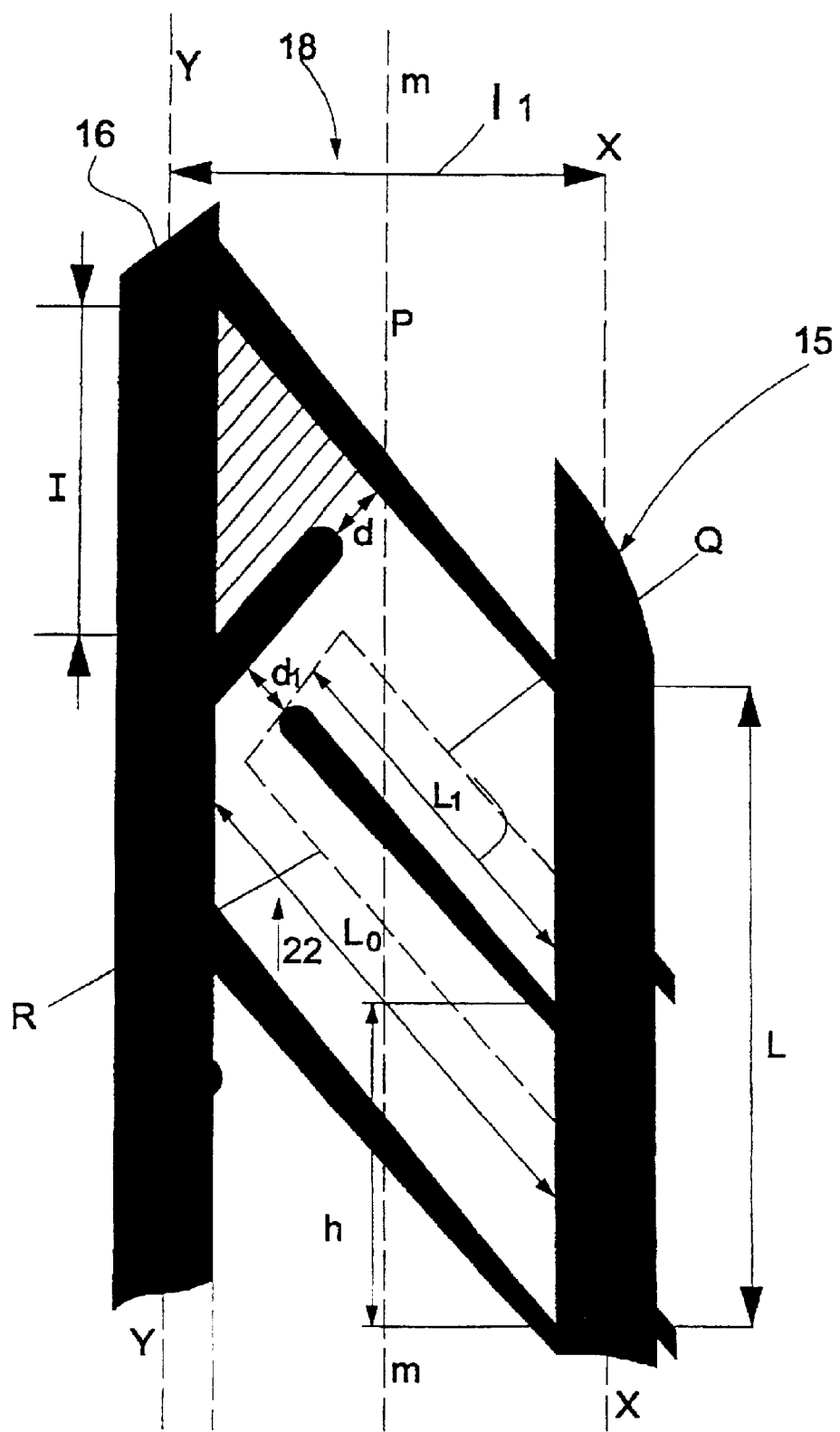
FIG. 4 shows an enlarged view of a detail of FIG. 2.

As shown in FIG. 4, said transversal notches 31, 34 give rise inside each block 22 to two different configurations: a first configuration substantially corresponding to a letter U (the wings Q and R of which are directed obliquely in relation to the equatorial plane X—X) and a second configuration substantially corresponding to a letter P. Said letter P has a conformation close to a rectangular triangle, the hypotenuse I of which is aligned with one of the walls delimiting lateral circumferential groove 16.

It must be pointed out that said hypotenuse I has a length determined by the phase displacement of the pitch of one pair of consecutive shoulder transversal notches 25 (defining a shoulder block 24) and the pitch of the pair of oblique grooves 23 adjacent to said pair of shoulder transversal notches 25 (defining block 22 of the central row adjacent to said shoulder block 24).

Preferably this phase displacement is between 40% and 60% of the pitch p, said pitch p preferably being between 25 mm and 45 mm.

Advantageously the two geometrical configurations of blocks 22 illustrated in FIG. 4, being different the one from the other, result in gripping fronts of the tyre on the ground that have different successive profiles. This diversity of the gripping profiles on the ground contributes to attenuating the causes of tyre noise due to the impact of the blocks on the ground while running.

Figure 5:
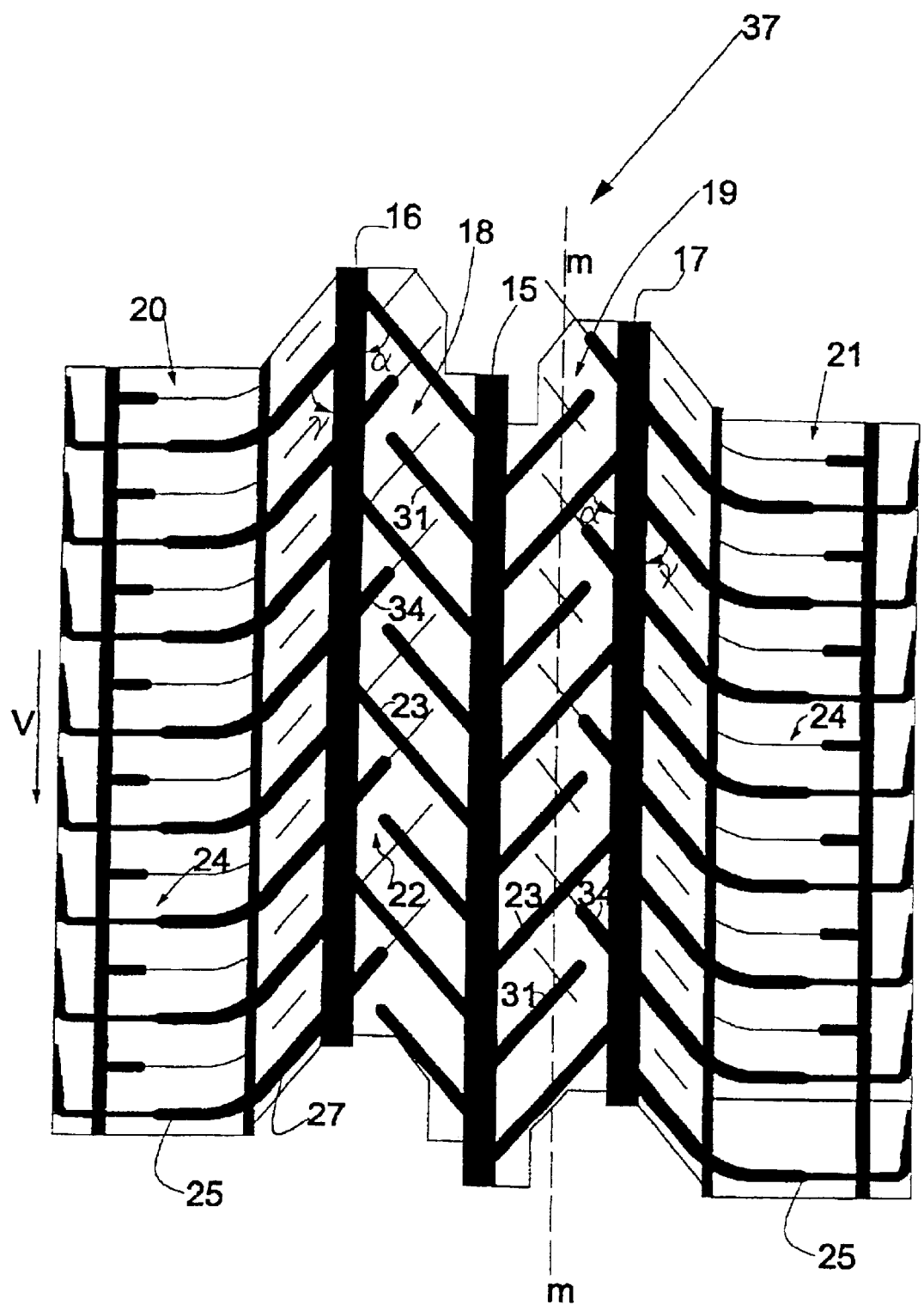
FIG. 5 shows a plan view of the development of the tread band according to the invention in accordance with a second embodiment.

FIG. 5 shows a further embodiment of the present invention relating to a tyre 37 of the symmetrical directional type, namely with an overall pattern having a predetermined rolling direction (indicated with the arrow V in the figure) and with the two lateral portions of the tread band, located to the sides of the equatorial plane X—X, which are mirror images of each other. The two halves of the tread band comprise the same pattern characteristics as previously described, therefore the elements of the tyre 37, structurally or functionally the same as those already illustrated with reference to tyre 1 shown in FIGS. 2 and 3, will be indicated with the same reference signs and will not be described any further.

As shown in the embodiment illustrated in FIG. 5, the portions of tread band are specular and also staggered with respect to each other in the circumferential direction by a value equal to approximately 50% of the pitch p of the shoulder transversal notches.

Said preferential values of said ratio, as indeed also the ranges cited above for the dimensional sizes described and the preferred values of the ratios between the above sizes are preferably relative to tyres having sizes 225/50R16 or 205/60R16 or 245/45R17.

This invention achieves numerous advantages.

Firstly it must be noted that the tread band of the invention has shoulder transversal grooves 25 and oblique grooves 23 of the central rows which are inclined in the direction opposite to one another in relation to the equatorial plane. In this way, a high running stability is attained which could not, on the other hand, be achieved where the grooves of continuous rows (central and shoulder rows) were provided with the same inclination tending, therefore, to form a continuous helix which would produce lateral thrusts in the helical direction, and in the direction opposite to one another during acceleration and braking.

Furthermore, the tread band of the invention, offering satisfactory resistance to external stresses, entails less mobility of the inner blocks and less wear.

To clarify this aspect, considering for example FIG. 2, it can be assumed that tyre 1 is mounted on the rear left wheel of a vehicle and that, having indicated with F the rolling direction, in the zone of contact of the tread band on the ground the tyre proceeds along a curving path towards the inside of the vehicle, i.e. towards the right according to FIG. 2.

In this situation, the resultant of the longitudinal force acting on the tyre and the centripetal force that balances the outwards thrust has direction and sense indicated by the arrow N in FIG. 2.

As shown, this resultant N acts in the transversal direction to block 22 in a direction that is substantially along the greater diagonal of block 22 itself.

As stated above, block 22 has a high ratio between the axial width 11 of the inner row of which it constitutes the solid part and the width of the tread band, as well as a considerable development in the longitudinal direction.

Therefore, thanks to the considerable extension of the block, the stresses N acting in cornering, in particular on winding roads, are elastically equilibrated thanks to the robustness of block 22 with consequent advantages for the driving stability.

To better clarify the advantages produced by the invention, it should be stressed that the considerable extension of the block of the inner rows does not in any way compromise driving and stability of the tyre on wet roads.

In fact, each block of the inner rows comprises transversal notches 31 the extension of which is of comparable shape and dimensions to transversal grooves 23 providing circumferential separation between the blocks.

As a result, said transversal groove 31 may act either by breaking the continuity of the continuous film of water which, in its absence, would be formed in the contact between tread band and ground along the footprint area, or as a means of draining for the disposal of water towards central groove 15.

As shown, the tread band preferably has further water draining means represented by the prolongations of transversal grooves 25 forming transversal notches 34 inside blocks 22.

Advantageously, it was found that said transversal notches 34 are capable of pushing the water collected under the footprint area with sufficient pressure to liberate lateral grooves 16, 17 that may become blocked by an excessive inflow of water.

Therefore, transversal notches 34 facilitate the disposal of water from lateral grooves 16, 17 towards shoulder transversal grooves 25 and from there towards the outside of the footprint area.

This favourable result is obtained by limiting the extension of transversal notches 34 in such a way as to avoid through the excessive prolongation of transversal grooves 23 the formation of a continuous helix, which causes driving instability.

It must be noted that the limited extension of transversal notches 34 does not prejudice their ability to drain water and to break the continuous film of water between block 22 and ground.

In fact, the phase displacement (FIG. 3) between the outer and inner rows is produced in such a way that shoulder transversal groove 25 extends while keeping at a distance from the vertex of block 22 in order to form a zone of still considerable extent capable of collecting and disposing of the water accumulated under the block.

Still more advantageously, transversal notches 31, 34 present in the inner rows contribute with transversal grooves 23 to endowing the tyre with gripping characteristics.

A further advantage of the invention comes from the fact that, by starting from a given desired pattern at one side of the tread band, it is possible to produce various types of pattern, such as a symmetrical pattern as in FIG. 2 or asymmetrical type by altering, for example, the intermediate zone on the right of FIG. 2 with respect to that on the left, or specular symmetrical type as shown in FIG. 5 or again asymmetrical with variations of the part on the right of FIG. 5 with respect to that on the left.

What is claimed is:

1. A tyre for vehicle wheels provided with a tread pattern, wherein the tread pattern comprises:

at least one continuous central circumferential groove straddling an equatorial plane of the tyre;

at least two continuous lateral circumferential grooves having median planes substantially parallel to the equatorial plane of the tyre; and a plurality of transverse grooves;

wherein the at least one central circumferential groove, the at least two lateral circumferential grooves, and the plurality of transverse grooves delimit at least four circumferential rows of blocks, two central rows and two shoulder rows, each block of the central rows being defined by a plurality of sides and at least four vertices, a pair of front vertices and a pair of rear vertices, in relation to a predetermined running direction of the tyre;

wherein the blocks of the central rows comprise a water-draining first transverse notch having a first terminal end inside a respective block of the central rows and a first starting end communicating with the at least one central circumferential groove, wherein the first transverse notch extends beyond a longitudinal median plane of a respective central row of blocks, wherein a first ratio of an axial width of the blocks of each central row to an overall axial width of a tread band, measured between shoulder ends of the tyre, is not less than 0.18:1, wherein the transverse grooves delimiting the blocks of the shoulder rows comprise, at least in a vicinity of a closest lateral circumferential groove, portions inclined in relation to the equatorial plane of the tyre in a direction opposite to an inclination of the transverse grooves delimiting the blocks of a closest central row, wherein the blocks of the central rows comprises a second transverse notch extending between a second terminal end inside a respective block and a second starting end in a position opposite the second terminal end, wherein respective first and second transverse notches are substantially perpendicular to each other, wherein the first transverse notches have a width between 2 mm and 7 mm, and wherein the transverse grooves delimiting the blocks of the central rows have a width between 2 mm and 7 mm.

2. The tyre of claim 1, wherein in the blocks of the central rows, a distance between the first terminal end of the first transverse notch and a longitudinal axis of a respective second transverse notch is between 5 mm and 15 mm.

3. The tyre of claim 1, wherein the inclined portion of alternate transverse grooves delimiting the blocks of the shoulder rows extends and forms the second transverse notch inside a respective block of the closest central row.

4. The tyre of claim 1, wherein the transverse grooves delimiting the blocks of the shoulder rows are repeated circumferentially with a predetermined first pitch.

5. The tyre of claim 4, wherein the first pitch is between 25 mm and 45mm for tyres having a circumferential development, measured along the equatorial plane of the tyre, between 1,970 mm and 2,010 mm.

6. The tyre of claim 4, wherein the blocks of the central rows are repeated circumferentially with a second pitch that is twice the first pitch.

7. The tyre of claim 4, wherein the transverse grooves delimiting the blocks of the central rows and the transverse grooves delimiting the blocks of the shoulder rows are staggered by an amount at least equal to 50% of the first pitch.

8. The tyre of claim 1, wherein the blocks of the central rows have a rhomboidal shape.

9. The tyre of claim 1, wherein each first transverse notch lies in a substantially intermediate position in a respective block.

10. The tyre of claim 1, wherein the first ratio is between 0.40:1 and 0.50:1.

11. The tyre of claim 1, wherein the inclined portion of at least one transverse groove delimiting the blocks of the shoulder rows extends and forms the second transverse notch inside a respective block of the closest central row.

12. A premoulded tread band for retreading worn tyres, wherein the tread band is provided with a tread pattern comprising:

at least one continuous central circumferential groove straddling an equatorial plane of the tyre;

at least two continuous lateral circumferential grooves having median planes substantially parallel to the equatorial plane of the tyre; and a plurality of transverse grooves;

wherein the at least one central circumferential groove, the at least two lateral circumferential grooves, and the plurality of transverse grooves delimit at least four circumferential rows of blocks, two central rows and two shoulder rows, each block of the central rows being defined by a plurality of sides and at least four vertices, a pair of front vertices and a pair of rear vertices, in relation to a predetermined running direction of the tyre;

wherein the blocks of the central rows comprise a water-draining first transverse notch having a first terminal end inside a respective block of the central rows and a first starting end communicating with the at least one central circumferential groove, wherein the first transverse notch extends beyond a longitudinal median plane of a respective central row of blocks, wherein a first ratio of an axial width of the blocks of each central row to an overall axial width of a tread band, measured between shoulder ends of the tyre, is not less than 0.18:1, wherein the transverse grooves delimiting the blocks of the shoulder rows comprise, at least in a vicinity of a closest lateral circumferential groove, portions inclined in relation to the equatorial plane of the tyre in a direction opposite to an inclination of the transverse grooves delimiting the blocks of a closest central row, wherein the blocks of the central rows comprise a second transverse notch extending between a second terminal end inside a respective block and a second starting end in a position opposite the second terminal end, wherein respective first and second transverse notches are substantially perpendicular to each other, wherein the first transverse notches have a width between 2 mm and 7 mm, and wherein the transverse grooves delimiting the blocks of the central rows have a width between 2 mm and 7 mm.

* * * * *